(12) United States Patent
Dietzen et al.

(10) Patent No.: US 7,776,244 B2
(45) Date of Patent: Aug. 17, 2010

(54) METHOD FOR PRODUCING EXPANDABLE POLYSTYRENE

(75) Inventors: Franz-Josef Dietzen, Hassloch (DE); Gerd Ehrmann, Deidesheim (DE); Bernhard Schmied, Frankenthal (DE); Martin Laun, Mannheim (DE); Klaus Hahn, Kirchheim (DE); Joachim Ruch, Stuttgart (DE); Markus Allmendinger, Deggingen (DE); Jan Holoch, Leimen (DE); Achim Datko, Leimen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1029 days.

(21) Appl. No.: 10/516,921

(22) PCT Filed: Jun. 6, 2003

(86) PCT No.: PCT/EP03/05952

§ 371 (c)(1),
(2), (4) Date: Dec. 7, 2004

(87) PCT Pub. No.: WO03/106544

PCT Pub. Date: Dec. 24, 2003

(65) Prior Publication Data

US 2005/0156344 A1     Jul. 21, 2005

(30) Foreign Application Priority Data

Jun. 14, 2002 (DE) ................................. 102 26 749

(51) Int. Cl.
*B29B 9/06* (2006.01)
*B29C 47/30* (2006.01)

(52) U.S. Cl. .................... 264/142; 264/51; 425/311; 425/67

(58) Field of Classification Search ................ 264/45.9, 264/51, 41, 37.32, 36.11, 413, 415, 431, 264/142, 141; 425/311, 67
See application file for complete search history.

(56) References Cited

U.S. PATENT DOCUMENTS 3,003,193 A    10/1961   Chisholm et al.

(Continued)

FOREIGN PATENT DOCUMENTS

CA     2142944     10/2001

(Continued)

OTHER PUBLICATIONS

Bremner, T., and A. Rudin, Melt Flow Index Values and Molecular Weight Distributions of Commercial Thermoplastics, J. of Applied Polymer Science, vol. 41 (1990) pp. 1617-1627.*

(Continued)

*Primary Examiner*—Matthew J. Daniels
(74) *Attorney, Agent, or Firm*—Novak Druce + Quigg LLP

(57) ABSTRACT

A process for the preparation of expandable styrene polymers having a molecular weight $M_w$ of greater than 170,000 g/mol, which comprises conveying a blowing agent-containing styrene polymer melt having a temperature of at least 120° C. through a die plate with holes whose diameter at the die exit is at most 1.5 mm, and subsequently granulating the extrudate, and expandable styrene polymers (EPS) having a molecular weight $M_w$ of more than 170,000 g/mol with 0.05 to 1.5% by weight of internal water.

13 Claims, 1 Drawing Sheet

U.S. PATENT DOCUMENTS

Figure 1:
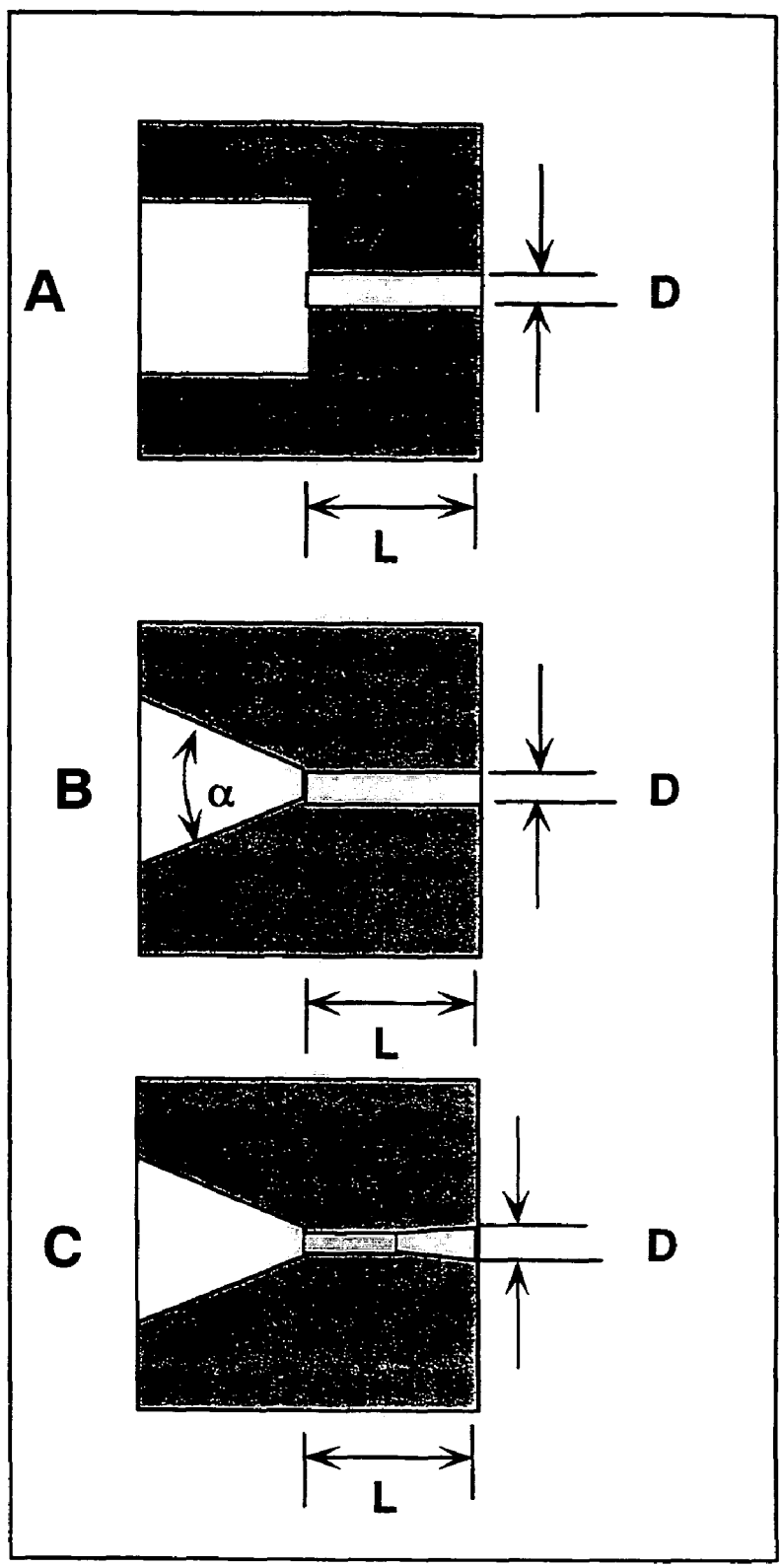

| | | | |
|---|---|---|---|
| 3,029,466 A * | 4/1962 | Guill | 425/313 |
| 3,072,581 A * | 1/1963 | Platzer | 521/60 |
| 3,673,126 A * | 6/1972 | Carmody et al. | 521/60 |
| 3,749,539 A | 7/1973 | Galbreath et al. | |
| 3,817,669 A | 6/1974 | Buckner | |
| 3,949,039 A | 4/1976 | Yamamoto et al. | |
| 3,981,959 A * | 9/1976 | Cuff | 264/142 |
| 4,606,873 A | 8/1986 | Biglione et al. | |
| 4,644,013 A | 2/1987 | Fujie et al. | |
| 4,661,302 A | 4/1987 | Park | |
| 4,673,694 A | 6/1987 | Meyer et al. | |
| 4,728,276 A | 3/1988 | Pauley et al. | |
| 4,772,636 A | 9/1988 | Sakata et al. | |
| 5,000,891 A | 3/1991 | Green | |
| 5,112,875 A * | 5/1992 | Zimmermann et al. | 521/60 |
| 5,271,886 A | 12/1993 | Collom et al. | |
| 5,605,937 A * | 2/1997 | Knaus | 521/60 |
| 5,661,191 A | 8/1997 | Haraguchi et al. | |
| 5,686,497 A | 11/1997 | Paleja et al. | |
| 6,046,245 A | 4/2000 | Glueck et al. | |
| 6,093,750 A | 7/2000 | Craig et al. | |
| 6,231,795 B1 | 5/2001 | Chaudhary et al. | |
| 6,340,713 B1 | 1/2002 | Glueck et al. | |
| 6,342,540 B1 | 1/2002 | Glueck et al. | |
| 6,465,533 B1 | 10/2002 | Eberstaller et al. | |
| 2006/0273482 A1 | 12/2006 | Kobayashi et al. | 264/41 |
| 2008/0203597 A1 | 8/2008 | Rogov et al. | 264/51 |

FOREIGN PATENT DOCUMENTS

| | | |
|---|---|---|
| DE | 1915950 | 12/1969 |
| DE | 3243332 A1 | 1/1984 |
| DE | 3702841 | 8/1987 |
| DE | 19813108 A1 | 9/1999 |
| DE | 19819058 A1 | 11/1999 |
| DE | 69605216 T2 | 4/2000 |
| EP | 0126459 B1 | 11/1984 |
| EP | 0217516 A2 | 4/1987 |
| EP | 0305862 A1 | 3/1989 |
| EP | 0638017 B1 | 2/1995 |
| EP | 0978527 A1 | 2/2000 |
| EP | 1455997 A1 | 9/2004 |
| EP | 1 666 222 | 6/2006 |
| EP | 1 857 242 | 11/2007 |
| GB | 699665 | 11/1953 |
| GB | 1015872 | 1/1966 |
| GB | 1048865 | 11/1966 |
| GB | 1062307 | 3/1967 |
| JP | 0631726 | 2/1994 |
| JP | 06136176 | 5/1994 |
| JP | 06298983 | 10/1994 |
| JP | 07316335 A | 12/1995 |
| JP | 1995316335 A | 12/1995 |
| JP | 09208735 | 8/1997 |
| JP | 09221562 | 8/1997 |
| JP | 11228727 | 8/1999 |
| WO | 9322119 A1 | 11/1993 |
| WO | 9745477 A1 | 12/1997 |
| WO | 9948955 A1 | 9/1999 |
| WO | 0043442 A1 | 7/2000 |
| WO | 03053651 A1 | 7/2003 |

OTHER PUBLICATIONS

Ullmann vol. 4, 1981, p. 268-270, 415-432, 131-132.

Kohlenstoffhandbuch Nr. V Polystyrol, 1969, p. 674-675, Hanser Verlag.

Osswald, Materials Science of Polymers for Engineers, 2003, p. 43, Hanser Publishers, Munich.

Kunststoffhandbuch Nr. 4, Polystyrol, 1996, p. 106, 342, 567, 568, 574, 575, 582, 583.

Sulzer, Company brochure, 1998.

Römpp, Chemie Lexikon, 1958, p. 3494-3495.

Römpp, Chemie Lexikon, 9th edition, 1992, p. 3570-3571.

Echte, Adolf Handbuch der technischen Polymerchemie, 1993, p. 393, 476, 477.

Henderson et al., "*Effects if the Die Temperature on Extrudate Swell in Screw Extrusion*" J. Appl. Pol. Sci. 31, 353-365 (1986).

Graessley et al., "*Die Swell in Molten Polymers*" Trans. Soc. Rheol. 14(4), 519-544 (1970).

Chang Dae Han, "*Flow of Molten Polymers through Circular and Slit Dies*" Rheology in Polymer Processing, Chap. 5, pp. 89-128, Academic Press, New York (1976).

Mack et al., "*Trends in Underwater Pelletizer Technolöogy: Considering New Types of Polyolefin Resins*" Polyolefins XI Retec, Houston, Texas, Feb. 1999.

Kaiser, "*Kunststoffchemie for Ingenieure*" pp. 300-301, Carl Hanser Verlag München Wien 2006.

Product Information Polystyrol 158K, BASF Plastics, Mar. 2001.

Mori, "*Correction Method for a Concentration Effect in the Calculation of Molecular Weight Averages from GPC Chromatograms*" J. Appl. Pol. Sci. 20, 2157-2164 (1976).

Kawai et al., "*Spinning of Man-Made Fibers and Film Making, I*" Soc. Pol. Sci. JP 160-161 (1967)—including English language translation.

Shenoy et al., "*Melt flow Index: More than just a Quality Control Rheological Parameter. Part I*" Adv. Pol. Tech. 6(1), 1-58 (1986).

Mori et al., "*Report on the cooperative determination of molecular weight averages of polymers by size exclusion chromatography. VII. A report on the forth round robin test (No. 1)*" Bunseki Kagaku 46(10), 837-844 (1997).

Ma et al., "*Foam Extrusion Characteristics of Thermoplastic Resin with Fluorocarbon Blowing Agent. II. Polystyrene Foam Extrusion*" Journal of Applied Polymer Science 28, 2983-2998 (1983).

Henderson et al., "*The Effect of Die Plate Temperature Gradients on Peliet Size Distribution from Underwater Die-Face Pelletizers*" Advances in Polymer Technology 5(3), 53-57 (1985).

"GALA", "SMUP 6D" (Underwater Granulator) Manual (1994).

"EPFL", Analytical Data EPFL—GPC determination of Molecular Weight (2008/2009).

"Viscotek", "*Analysis of two Polystyrene Samples by Tripple Detection Method Size Exclusion Chromatography*" Analytical Data (2009).

"EMPA-1", GPC determination of Molecular Weight—Analytical Data (2009).

"EMPA-2", EMPA Report on Round Robin Tests—GPC/SEC determination of Molecular Weight (2004).

"Deutsche Norm", DIN 55672-1 "*Gel permeation chromatography (GPC)—Part 1: Tetrahydrofuran (THF) as elution solvent*" (1995).

Prof. Kulicke, "*Expert Opinion regarding European Patent EP 1 517 947 B1, in the version of Nov. 25, 2008*" (2009).

* cited by examiner

METHOD FOR PRODUCING EXPANDABLE POLYSTYRENE

The present invention relates to a process for the preparation of expandable styrene polymers having a molecular weight Mw of greater than 170,000 g/mol, in which a blowing agent-containing styrene polymer melt having a temperature of at least 120° C. is conveyed through a die plate having holes whose diameter at the die exit is at most 1.5 mm, and subsequently granulating the extrudate, and to expandable styrene polymers (EPS) having a molecular weight $M_w$ of more than 170,000 g/mol with 0.05 to 1.5% by weight of internal water.

Processes for the preparation of expandable styrene polymers, such as expandable polystyrene (EPS), by suspension polymerization have been known for some time. These processes have the disadvantage that large amounts of waste water are produced and have to be disposed of. The polymers have to be dried in order to remove internal water. In addition, the suspension polymerization generally results in broad bead-size distributions, which have to be sieved in a complex manner to give different bead fractions.

Furthermore, expanded (for example U.S. Pat. No. 3,817, 669) and expandable styrene polymers can be prepared by extrusion processes (GB-A-1,062,307). EP-A 668 139 describes a process for the economical production of expandable polystyrene granules (EPS) in which the blowing agent-containing melt is produced by means of static mixing elements in a dispersion, hold and cooling step and is subsequently granulated. Owing to the cooling of the melt to a few degrees above the solidification temperature, it is necessary to dissipate large amounts of heat.

WO 98/51735 describes expandable styrene polymers which comprise graphite particles and have reduced thermal conductivity, these being obtainable via suspension polymerization or via extrusion in a twin-screw extruder. The high shear forces in a twin-screw extruder generally result in significant reduction of molecular weight of the polymer used, and/or some decomposition of additives such as flame retardants.

The cell number and foam structure obtained during foaming of the expandable styrene polymers (EPS) are of decisive importance for achieving ideal insulation properties and good surfaces on the foams. EPS granules produced by extrusion can often not be foamed to give foams with ideal foam structure.

It is an object of the present invention to remedy the above-mentioned disadvantages and to provide an economical process for the production of expandable styrene polymer granules of small granule size and uniform granule size distribution, which in particular can be foamed to give foams with homogeneous structure and high cell number.

We have found that this object is achieved by the process described at the outset and by expandable styrene polymers (EPS) having a molecular weight $M_w$ of more than 170,000 g/mol which comprise 0.05 to 1.5% by weight of internal water.

It has been found that styrene polymers having molecular weights Mw of less than 170,000 result in polymer abrasion during granulation. The expandable styrene polymer preferably has a molecular weight in the range from 190,000 to 400,000 g/mol, particularly preferably in the range from 220,000 to 300,000 g/mol. Owing to molecular weight reduction caused by shearing and/or the effect of temperature, the molecular weight of the expandable polystyrene is generally about 10,000 g/mol below the molecular weight of the polystyrene employed.

In order to obtain very small granule particles, the die swell after the die exit should be as low as possible. It has been found that the die swell can be influenced, inter alia, by the molecular weight distribution of the styrene polymer. The expandable styrene polymer should therefore preferably have a molecular weight distribution with a polydispersity $M_w/M_n$ of at most 3.5, particularly preferably in the range from 1.5 to 2.8 and very particularly preferably in the range from 1.8 to 2.6.

The styrene polymers employed are preferably transparent polystyrene (GPPS), high-impact polystyrene (HIPS), anionically polymerized polystyrene or high-impact polystyrene (A-IPS), styrene-α-methylstyrene copolymers, acrylonitrile-butadiene styrene polymers (ABS), styrene-acrylonitrile (SAN), acrylonitrile-styrene acrylate (ASA), methacrylate-butadiene styrene (MBS), methyl methacrylate-acrylonitrile-butadiene-styrene (MABS) polymers or mixtures thereof or with polyphenylene ether (PPE).

To improve mechanical properties or thermal stability, the styrene polymers mentioned may be blended, where appropriate with the use of compatibilizers, with thermoplastic polymers, such as polyamides (PAs), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones or polyether sulfides (PES) or mixtures of these, generally in total proportions up to a maximum of 30% by weight, preferably in the range from 1 to 10% by weight, based on the polymer melt. Mixtures within the ranges of amounts mentioned are also possible with, by way of example, hydrophobically modified or functionalized polymers or oligomers, rubbers, such as polyacrylates or polydienes, e.g. styrene-butadiene block copolymers, or biodegradable aliphatic or aliphatic/aromatic copolyesters.

Recycled polymers comprising the thermoplastic polymers mentioned, in particular styrene polymers and expandable styrene polymers (EPS) may also be admixed with the styrene polymer melt in amounts which do not substantially impair its properties, generally in amounts of at most 30% by weight, in particular in amounts of from 1 to 10% by weight.

The blowing agent-containing styrene polymer melt generally comprises one or more blowing agents in homogeneous distribution in a total proportion of from 2 to 10% by weight, based on the blowing agent-containing styrene polymer melt. Suitable blowing agents are the physical blowing agents usually employed in EPS, such as aliphatic hydrocarbons having from 2 to 7 carbon atoms, alcohols, ketones, ethers or halogenated hydrocarbons. Preference is given to isobutane, n-butane, isopentane and n-pentane.

To improve foamability, finely dispersed droplets of internal water may be introduced into the styrene polymer matrix. By way of example, this can be achieved via addition of water to the molten styrene polymer matrix. The addition preferably takes place prior to the feed of blowing agent. Kneading elements or static mixers can be used to achieve homogeneous distribution of the water.

The amount of water added is selected in such a way as to give the expandable styrene polymers (EPS) an expansion capability a, defined as bulk density prior to foaming/bulk density after foaming, of at most 125. A sufficient amount of water is generally from 0.05 to 1.5% by weight, based on the styrene polymer.

Expandable styrene polymers (EPS) with at least 90% of the internal water in the form of droplets of internal water whose diameter is in the range from 0.5 to 15 µm form, on foaming, foams with adequate cell number and homogeneous foam structure.

The inventive expandable styrene polymer granules (EPS) generally have a bulk density of at most 700 g/l.

The styrene polymer melt may furthermore comprise additives, nucleating agents, plasticizers, flame retardants, soluble and insoluble inorganic and/or organic dyes and pigments, e.g. IR absorbers, such as carbon black, graphite or aluminum powder, added together or at separate locations. The amounts generally added of the dyes and pigments are in the range from 0.01 to 30% by weight, preferably in the range from 1 to 5% by weight. In order to obtain homogeneous and microdispersed distribution of the pigments in the styrene polymer, it can be advantageous, in particular in the case of polar pigments, to use a dispersing agent, e.g. organosilanes or maleic-anhydride-grafted stryene polymers, and to incorporate the material by mixing at low shear rates, e.g. below 30/sec, by way of an ancillary extruder or by way of a static mixer. Preferred plasticizers are mineral oils, oligomeric styrene polymers, and phthalates, in amounts of from 0.05 to 10% by weight, based on the styrene polymer.

The relatively high-molecular-weight styrene polymers enable the blowing agent-containing styrene polymer melt to be conveyed through the die plate at a temperature in the range from 140 to 300° C., preferably in the range from 160 to 240° C. Cooling into the region of the glass transition temperature is not necessary.

The die plate is heated at least to the temperature of the blowing agent-containing polystyrene melt. The temperature of the die plate is preferably in the range from 20 to 1001 C above the temperature of the blowing agent-containing polystyrene melt. Polymer deposits in the dies are thus prevented and salt-free granulation ensured.

In order to obtain marketable granule sizes, the diameter (D) of the die holes at the die exit should be in the range from 0.2 to 1.5 mm, preferably in the range from 0.3 to 1.2 mm, particularly preferably in the range from 0.3 to 0.8 mm. Even after die swell, granule sizes of less than 2 mm, in particular in the range from 0.4 to 0.9 mm, can thus be set specifically.

Besides the molecular weight distribution, the die swell can be influenced by the die geometry. Examples of suitable die geometries are shown in FIG. 1. The length (L) denotes the die zone whose maximum diameter corresponds at most to the diameter (D) at the die exit. The die plate preferably has holes having an L/D ratio of at least 2. The L/D ratio is preferably in the range from 3 to 10.

In general, the diameter (E) of the holes at the die entrance of the die plate should be at least twice as large as the diameter (D) at the die exit.

An embodiment of the die plate has holes having a conical inlet and an inlet angle α of less than 180°, preferably in the range from 30 to 120°. In a further embodiment, the die plate has holes having a conical outlet and an outlet angle β of less than 90°, preferably in the range from 15 to 45°. In order to produce specific granule-size distributions of the styrene polymers, the die plate can be provided with holes of different outlet diameter (D). The various embodiments of the die geometry can also be combined with one another.

A particularly preferred process for the preparation of expandable styrene polymers having a molecular weight Mw of greater than 170,000 g/mol comprises the following steps:

a) polymerization of styrene monomer and, if desired, copolymerizable monomers, b) degassing of the resultant styrene polymer melt, c) mixing of the blowing agent and, if desired, additives into the styrene polymer melt by means of static or dynamic mixers at a temperature of at least 150° C., d) cooling of the blowing agent-containing styrene polymer melt to a temperature of at least 120° C., e) discharge through a die plate having holes whose diameter at the die exit is at most 1.5 mm, and f) granulation of the blowing agent-containing melt.

In step f), the granulation can be carried out directly behind the die plate under water at a pressure in the range from 1 to 10 bar.

The polymerization in stage a) and degassing in stage b) directly provides a polymer melt for impregnation by the blowing agent in stage c), and no melting of styrene polymers is needed. This is not only more cost-effective but also gives expandable styrene polymers (EPS) with lower styrene monomer contents, because the mechanical action of shear in the homogenizing section of an extruder—exposure which generally leads to breakdown of polymers to give monomers—is avoided. In order to keep the styrene monomer content low, in particular below 500 ppm, it is also advantageous to minimize the amount of mechanical and thermal energy introduced in all of the subsequent stages of the process. Particular preference is therefore given to the maintenance of shear rates below 30/sec and temperatures below 260° C., and also to short residence times in the range from 1 to 10 minutes, preferably from 2 to 5 minutes, in stages c) to e). It is particularly preferable to use exclusively static mixers in the entire process. The polymer melt may be transported and discharged via pressure pumps, e.g. gear pumps.

Another method of reducing styrene monomer content and/or amount of residual solvent, such as ethylbenzene, consists in providing a high level of degassing in stage b) by means of entrainers, such as water, nitrogen, or carbon dioxide, or carrying out the polymerization stage a) by an anionic route. Anionic polymerization of styrene not only gives styrene polymers with low styrene monomer content but also gives very low styrene oligomer contents.

In order to improve the processing properties, the finished expandable styrene polymer granules can be coated with glycerol esters, antistatics or non-stick agents.

EXAMPLES

Unless otherwise stated in the examples, the examples were carried out using a blowing agent-containing polystyrene melt comprising PS 158 K from BASF Aktiengesellschaft having a viscosity number VN of 98 ml/g ($M_w$=280,000 g/mol, polydispersity Mw/Mn=3.0) and 6% by weight of n-pentane.

Example 1

The blowing agent-containing polystyrene melt (6% by weight of n-pentane) was conveyed at a throughput of 100 kg/h through a die plate having 300 holes (diameter at the die exit (D) 0.4 mm, corresponding to shape A in FIG. 1). The melt temperature was 160° C. The expandable polystyrene granules obtained had a uniform granule diameter of 1.0 mm. Styrene monomer content was determined as 400 ppm.

Increasing the melt temperature resulted in a reduction in the granule diameter.

| Melt temperature (° C.) | Granule diameter (mm) |
|---|---|
| 160 | 1.0 |
| 180 | 0.8 |
| 200 | 0.65 |

Example 2

The blowing agent-containing polystyrene melt (6% by weight of n-pentane) was conveyed at a throughput of 100 kg/h through a die plate having 300 holes (diameter at the die exit (D) 0.4 mm, corresponding to shape A in FIG. 1). The temperature of the melt and the die plate were each 200° C. The expandable polystyrene granules obtained had a uniform granule diameter of 0.65 mm.

| Melt temperature (° C.) | Die-plate temperature (° C.) | Granule diameter (mm) |
|---|---|---|
| 200 | 180 | 0.80 |
| 200 | 200 | 0.65 |
| 200 | 220 | 0.60 |
| 200 | 240 | 0.55 |

Example 3

The blowing agent-containing polystyrene melt (6% by weight of n-pentane) was conveyed at a throughput of 100 kg/h through a die plate having 300 holes (diameter at the die exit (D) 0.4 mm, with a conical inlet angle corresponding to shape B in FIG. 1). The melt temperature was 180° C.

| Inlet angle (α) | Granule diameter (mm) |
|---|---|
| 180° | 0.8 |
| 90° | 0.7 |
| 45° | 0.65 |
| 30° | 0.60 |

Example 4

The blowing agent-containing polystyrene melt (6% by weight of n-pentane) was conveyed at a throughput of 100 kg/h through a die plate having 150 holes (diameter at the die exit (D) 0.6 mm). The melt temperature was 180° C.

| Die shape according to FIG. 1 | Granule diameter (mm) |
|---|---|
| B | 1.1 |
| C | 0.72 |

Example 5

The blowing agent-containing polystyrene melt (6% by weight of n-pentane) was conveyed at a throughput of 100 kg/h through a die plate having 150 holes (diameter at the die exit (D) 0.6 mm, corresponding to shape A). The melt temperature was 180° C.

| Additive | Granule diameter (mm) |
|---|---|
| None | 1.1 |
| 3% by weight of mineral oil | 0.8 |
| 5% by weight of butyl benzyl phthalate | 0.8 |
| 5% by weight of low-molecular-weight GPPS ($M_w$ = 5000) | 0.75 |

Example 6

Polystyrenes having the properties from Example 1, but with different polydispersities Mw/Mn were employed. The blowing agent-containing polystyrene melt (6% by weight of n-pentane) was conveyed at a throughput of 100 kg/h through a die plate having 300 holes (diameter at the die exit (D) 0.4 mm, corresponding to shape A in FIG. 1). The melt temperature was 180° C.

| Mw/Mn | Granule diameter (mm) |
|---|---|
| 3 | 0.8 |
| 2 | 0.6 |
| 1.5 | 0.5 |

Example 7

0.1% by weight of water and 6% by weight of n-pentane were added to a polystyrene melt (PS 158 K) and the material was conveyed at a throughput of 100 kg/h through a die plate having 300 holes (diameter at the die exit (D) 0.4 mm, corresponding to shape A in FIG. 1). The melt temperature was 160° C. The resultant expandable polystyrene granules had uniform granule diameter of 1.0 mm. The resultant granules were expanded in a current of steam to give foam particles with a fine-celled foam structure which was evaluated under a microscope. The cell number was from about 4 to 4.5 cells/mm. More than 90% of the droplets of internal water had a diameter of 1.5 μm.

Example 8

Example 7 was repeated, except that 0.6% by weight of water was added to the polymer melt. The resultant expandable polystyrene granules had uniform granule diameter of 1.0 mm. The resultant granules were expanded in a current of steam to give foam particles with a fine-celled foam structure which was evaluated under a microscope. The cell number was from about 8 to 8.5 cells/mm. More than 90% of the droplets of internal water had a diameter of 10.5 μm.

Example 9

6% by weight of n-pentane, 0.3% by weight of a polystyrene-maleic anhydride graft copolymer as dispersing agent, and 0.8% by weight of silver metal pigment, based in each case on the polymer melt, were added to a polystyrene melt (PS 158 K), and the material was conveyed at a throughput of 100 kg/h through a die plate having 300 holes (diameter at the die exit (D) 0.4 mm, corresponding to shape A in FIG. 1). The melt temperature was 160° C. The resultant expandable polystyrene granules had uniform granule diameter of 1.0 mm. The resultant granules were expanded in a current of steam to give foam particles with a homogeneous foam structure.

Example 10

Example 9 was repeated except that 0.8% by weight of a gold metal color pigment and 0.3% by weight of organosilane as dispersing agent were added. The resultant expandable polystyrene granules had uniform granule diameter of 1.0 mm and were expanded with a current of steam to give foam particles with homogenous foam structure.

Example 11

A polymer melt comprising blowing agent (polystyrene with a viscosity number VN of 74 ml/g, average molecular weight $M_w$ of 190,000 g/mol and polydispersity $M_w/M_n$ of 3.0, and 6% by weight of n-pentane) was conveyed at a throughput of 300 kg/h by way of a start-up valve with oil-heated, adjustable constrictor (start-up melt pressure about 180 bar) through a die plate having 300 holes with 0.6 mm diameter at the die exit. The resultant expandable polystyrene granules had a narrow particle size distribution, 80% of the particles having a diameter in the range from 0.62 to 0.8 mm. The residual monomer content was determined as 325 ppm.

We claim:

1. A process for the preparation of expandable styrene polymers having a molecular weight $M_w$ of from 220,000 to 300,000 g/mol, which comprises conveying a blowing agent-containing styrene polymer melt having a temperature in the range from 160 to 240° C. through a die plate with holes whose diameter at the die exit is in a range from 0.2 to 1.2 mm and wherein the die plate is heated to a temperature in the range of from 20 to 100° C. above the temperature of the blowing agent-containing polymer melt, and subsequently granulating the extrudate.

2. A process as claimed in claim 1, wherein the expandable styrene polymer has a molecular weight distribution having a polydispersity Mw/Mn of at most 3.5.

3. A process as claimed in claim 1, wherein the styrene polymer employed is transparent polystyrene (GPPS), high-impact polystyrene (HIPS), an acrylonitrile-butadiene-styrene polymer (ABS), styrene-acrylonitrile (SAN) or a mixture thereof or with polyphenylene ether (PPE).

4. A process as claimed in claim 1, wherein the blowing agent-containing styrene polymer melt comprises, in homogeneous distribution, from 2 to 10% by weight of one or more blowing agents selected from the group consisting of aliphatic hydrocarbons having from 2 to 7 carbon atoms, alcohols, ketones, ethers or halogenated hydrocarbons.

5. A process as claimed in claim 1, wherein the blowing agent-containing styrene polymer melt comprises plasticizers selected from the group consisting of: mineral oils, oligomeric styrene polymers and phthalates, in proportions in the range from 0.05 to 10% by weight, based on the styrene polymer.

6. A process as claimed in claim 1, wherein the die plate has holes having an L/D ratio (length (L) of the die zone, whose diameter corresponds at most to the diameter at the die exit, to the diameter (D) at the die exit) of at least 2.

7. A process as claimed in claim 1, wherein the diameter (E) of the holes at the die entrance of the die plate is at least twice as great as the diameter (D) at the die exit.

8. A process as claimed in claim 1, wherein the die plate has holes having a conical inlet with an inlet angle a of less than 180°.

9. A process as claimed in claim 1, wherein the die plate has holes having a conical outlet with an outlet angle β of less than 90°.

10. A process as claimed in claim 1, wherein the die plate has holes having different exit diameters (D).

11. A process as claimed in claim 1, wherein the blowing agent-containing styrene polymer melt comprises 0.05 to 1.5% by weight of water, based on the styrene polymer.

12. The process as claimed in claim 1, comprising the following steps:
   a) polymerization of styrene monomer or styrene monomer and co-polymerizable monomers,
   b) degassing of the resultant styrene polymer melt,
   c) mixing of the blowing agent and, if desired, additives into the styrene polymer melt by means of static or dynamic mixers at a temperature of at least 150° C.,
   d) cooling of the blowing agent-containing styrene polymer melt to a temperature in the range of from 160 to 240° C.,
   e) discharge through a die plate having holes whose diameter at the die exit is in the range from 0.2 to 1.2 mm, and
   f) granulation of the blowing agent-containing melt.

13. A process as claimed in claim 12, wherein step f) is carried out directly behind the die plate under water at a pressure in the range from 1 to 10 bar.

* * * * *

UNITED STATES PATENT AND TRADEMARK OFFICE
CERTIFICATE OF CORRECTION

| | | |
|---|---|---|
| PATENT NO. | : 7,776,244 B2 | Page 1 of 1 |
| APPLICATION NO. | : 10/516921 | |
| DATED | : August 17, 2010 | |
| INVENTOR(S) | : Dietzen et al. | |

It is certified that error appears in the above-identified patent and that said Letters Patent is hereby corrected as shown below:

In Claim 8, col. 8, indicated line 19:
"inlet angle a of" should read --inlet angle α of--

Signed and Sealed this
Fifth Day of April, 2011

David J. Kappos
*Director of the United States Patent and Trademark Office*